Figure 1:
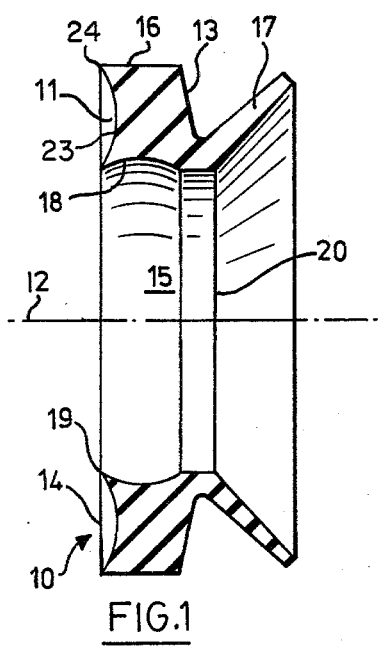

United States Patent [19]

Kronenberg

[11] 4,311,315
[45] Jan. 19, 1982

[54] SHAFT SEAL

[75] Inventor: Ernst A. Kronenberg, Basel, Switzerland

[73] Assignee: Sealing AG, Basel, Switzerland

[21] Appl. No.: 104,536

[22] Filed: Dec. 17, 1979

[30] Foreign Application Priority Data

Nov. 27, 1979 [CA] Canada .................................. 340703

[51] Int. Cl.³ .............................................. F16J 15/32
[52] U.S. Cl. ...................................................... 277/95
[58] Field of Search ................. 277/25, 207, 81 R, 25, 277/95

[56] References Cited

U.S. PATENT DOCUMENTS

| | | |
|---|---|---|
| 2,243,227 | 5/1941 | Stratton . |
| 3,016,251 | 1/1962 | Gilbert . |
| 3,317,214 | 5/1967 | Durgom .......................... 277/207 A |
| 3,494,649 | 2/1970 | Malmstrom . |
| 3,504,917 | 4/1970 | Malmstrom ............................ 277/25 |
| 3,601,412 | 8/1971 | Malmstrom . |
| 3,611,847 | 10/1971 | Derman et al. . |
| 3,615,097 | 10/1971 | Malmstrom . |
| 3,664,675 | 5/1972 | Malmstrom . |
| 3,685,838 | 8/1972 | Malmstrom . |
| 3,703,296 | 11/1972 | Malmstrom . |
| 3,713,659 | 1/1973 | Derman et al. . |
| 3,813,102 | 5/1974 | Derman . |
| 3,814,446 | 6/1974 | Derman . |
| 3,829,227 | 8/1974 | Derman . |
| 4,071,255 | 1/1978 | Salter . |

FOREIGN PATENT DOCUMENTS 691504 7/1964 Canada .

Primary Examiner—Robert I. Smith

[57] ABSTRACT

In a shaft seal of resiliently deformable elastomeric material and which comprises a seal body of annular form having a longitudinal axis and having an annular front face, an annular rear face, an annular inner face, and an annular outer face, and a frusto-conical sealing flange extending outwardly and forwardly from the front face of the seal body adjacent the inner face thereof, there can be a tendency when the seal is in use with the seal body resiliently deformably mounted on a rotatable shaft and with the sealing flange in bearing contact with a fixed wall having an opening through which the shaft is disposed for the seal operatively to move axially radially relative to the shaft particularly when the shaft is rotated at high speed. To reduce this tendency the inner face of the seal body has an annular concavity which operatively provides a suction cup effect more firmly to secure the seal body to the shaft, and the rear face of the seal body has an annular concavity which, with the seal body operatively resiliently deformed in tight contact with an annular shoulder presented by the shaft, likewise provides a suction cup effect between the seal body and the shoulder.

10 Claims, 3 Drawing Figures

SHAFT SEAL

This invention is concerned with a shaft seal of resiliently deformable elastomeric material, the seal being of the type comprising a seal body of annular form having a longitudinal axis, and a frusto-conical sealing flange which extends outwardly and forwardly from a front face of the seal body adjacent an inner face thereof. In this type of shaft seal, examples of which are disclosed in U.S. Pat. No. 3,713,659 issued on Jan. 30, 1973 to Derman et al. and Canadian Pat. No. 691,504 granted on July 28, 1964 to Forsheda Gummifabrik Aktiebolag, the inner face of the seal body is of lesser diameter than the rotatable shaft on which the seal is operatively to be mounted, so that when the seal is operatively mounted on the shaft with the sealing flange in bearing contact with a fixed wall, such as a portion of a fixed housing having therein an opening through which the shaft is disposed, the seal body is resiliently deformed with a view to maintaining the seal in firm securement on the shaft. However, in spite of this resilient deformation of the seal body the seal may nevertheless so move axially along the shaft that the sealing flange tends to lose bearing contact with the fixed wall, particularly during high speed rotation of the shaft and the seal mounted thereon.

It is a primary object of the present invention to provide a shaft seal of the type hereinbefore described in which, when in use, the seal is, more firmly secured to the shaft on which it is operatively mounted thereby to reduce the above tendency for the seal operatively to move axially along the shaft during rotation of the shaft and seal, and the seal is firmly secured to a shoulder presented by the shaft and with which a rear face of the seal is operatively in contact.

According to the present invention there is provided a shaft seal of resiliently deformable elastomeric material, the seal comprising a seal body of annular form having a longitudinal axis and comprising an annular front face, an annular rear face, and an annular inner face; and a frusto-conical sealing flange extending outwardly and forwardly from the front face of the seal body adjacent the inner face thereof; the inner face of the seal body having an annular concavity; and the rear face of the seal body having an annular concavity.

Figure 2:
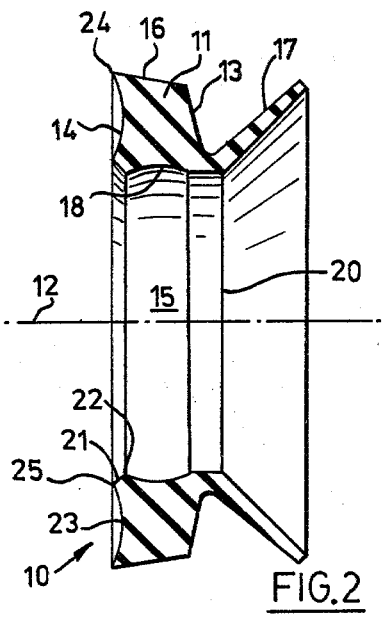
Figure 3:
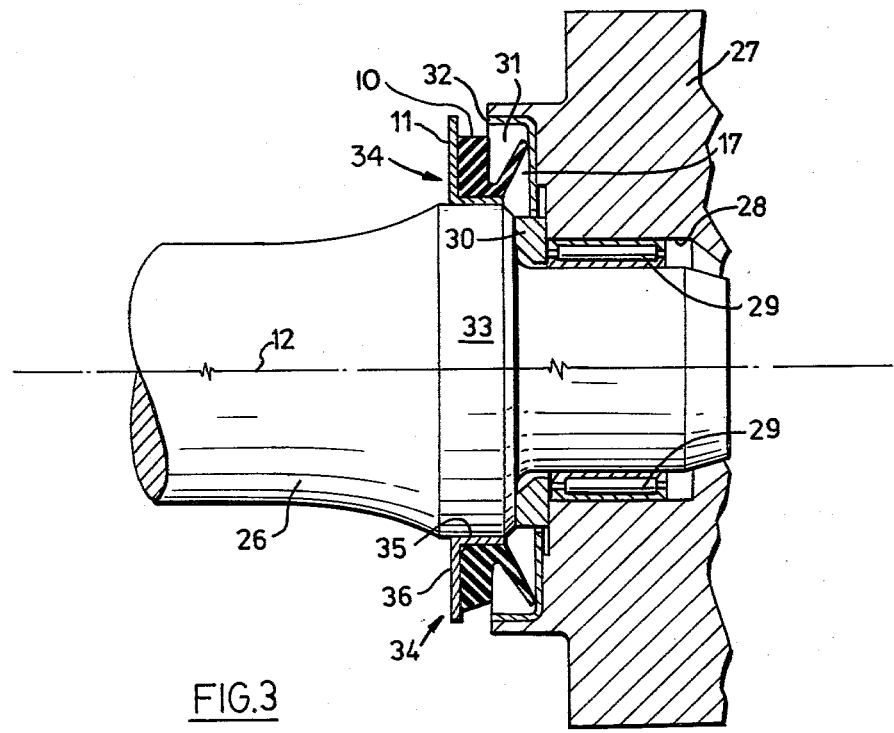

In order that the invention may be more clearly understood and more readily carried into effect the same will now, by way of example, be more fully described with reference to the accompanying drawing in which:

FIG. 1 is a sectioned view of a shaft seal according to a first preferred embodiment of the invention;

FIG. 2 is a sectional view of a shaft seal according to a second preferred embodiment of the invention; and FIG. 3 is a sectioned view of an assembly incorporating a rotatable shaft on which a shaft seal according to the invention is operatively mounted, the upper half of this view showing a shaft seal according to the first preferred embodiment shown in FIG. 1 and the lower half of this view showing a shaft seal according to the second preferred embodiment shown in FIG. 2.

Referring to the drawing, 10 denotes generally a shaft seal which is integrally formed of a resiliently deformable elastomeric material, such as nitrile or other synthetic rubber which is resistant to conventional oil or grease lubricants, the seal 10 comprising a seal body 11 having a longitudinal axis 12 and having an annular front face 13, an annular rear face 14, an annular inner face 15, and an annular outer face 16. A frusto-conical sealing flange 17 extends outwardly and forwardly from the front face 13 of the seal body 11 adjacent the inner face 15 thereof, this sealing flange 17 preferably being of tapered thickness as clearly shown in FIGS. 1 and 2.

The inner face 15 has an annular concavity 18 which in cross-section on a plane containing the longitudinal axis 12, i.e. in cross-section as viewed in FIGS. 1 and 2, is of curved form such as of arcuate form, although alternatively it could be of, for example, parabolic form, the concavity 18 being spaced rearwardly from the front end 20 of the inner face 15. The rear face 14 has an annular concavity 23 which in cross-section on a plane containing the longitudinal axis 12, i.e. in cross-section as viewed in FIGS. 1 and 2, is of curved form such as of arcuate form, although as in the case of the annular concavity 18 it could alternatively be of, for example, parabolic form.

As shown in FIG. 1, the annular concavity 18 may extend to the rear face 14 of the seal body 11, whereby to present an inwardly and rearwardly, directed annular edge 19 at the junction of the concavity 18 and the rear face 14, the concavity 23 in the rear face 14 preferably also extending to this edge 19 and to the outer face 16 whereby to present a rearwardly, and outwardly, directed annular edge 24 at the junction of the concavity 23 and the outer face 16.

The shaft seal illustrated in FIG. 2 differs from that illustrated in FIG. 1 in that in the embodiment shown in FIG. 2 an annular chamfer 21 interconnects the inner face 15 and the rear face 14 of the seal body 11, with the annular concavity 18 extending not to the rear face 14 but to the chamfer 21 and the annular concavity 23 likewise extending to the chamfer 21, whereby to present inwardly and rearwardly directed annular edges 22 and 25 at the junctions of the concavities 18 and 23, respectively, with the chamfer 21. Furthermore the outer face 16 may be of frusto-conical form as shown in FIG. 2.

Referring now to FIG. 3, the assembly illustrated therein comprises a rotatable shaft 26 and a fixed wall 27 having an opening 28 through which a portion of the shaft 26 is disposed. Roller bearings 29 are disposed within the opening 28 between the fixed wall 27 and the associated portion of the shaft 26, a fixed thrust ring 30 between the fixed wall 27 and the shaft portion 33 being provided. A cavity 31 in the face of the wall 27 is provided with a fixed liner 32.

An annular member 34 having a limb 35 and a shoulder 36 is fixedly mounted on the portion 33 of the shaft 26, the shaft seal 10 being mounted on the limb 35 of the member 34 with the sealing flange 17 in bearing contact with the liner 32. The outer diameter of the limb 35 of the member 34 is greater than the diameter of the inner face 15 of the seal body 11, so that when the seal 10 is mounted thereon the seal body 11 is resiliently deformed with the portions of the inner face 15 bounding the concavity 18, i.e. the edge 19 (FIG. 1) or the edge 22 (FIG. 2) and the portion of the inner face 15 between the concavity 18 and the front end 20 of the inner face 15, in tight contact with the limb 35 of the member 34 thereby to exclude the entry of any contaminants between the inner face 15 of the seal body 11 and the limb 35 of the member 34. In this condition the concavity 18 provides a suction cup effect between the seal body 11 and the limb 35 of the member 34 thereby more firmly to secure the seal 10 to the shaft 26. The rearward spacing of the concavity 18 from the front end 20 of the inner face 15 ensures that during operative rotation of the shaft 26 and seal 10 any radial movement of the sealing flange 17 under the influence of centrifugal force does not affect the firm securement of the seal body 11 to the shaft 26. Furthermore, the portions of the rear face 14 bounding the concavity 23, i.e. the edges 24 and 19 (FIG. 1) or 24 and 25 (FIG. 2), are in tight contact with the shoulder 36 of the member 34, with the concavity 23 providing a suction cup effect between the seal body 11 and the shoulder 36 of the member 34 thereby firmly to secure the seal body 11 against any tendency for radial movement thereof to occur particularly during high speed rotation of the shaft 26. The tight contact of the edge 24 with the shoulder 36 results in outward deflection of the edge 24.

As shown in the lower half of FIG. 3 which illustrates the shaft seal 10 according to the embodiment of FIG. 2, the chamfer 21 accommodates the small radius at the junction of the limb 35 and the shoulder 36 of the member 34, and also accommodates displacement of the material of the seal body 11 during the above-described resilient deformation thereof. The seal 10 serves substantially to prevent the ingress of contaminant and the discharge of grease which is used to lubricate the bearings 29.

While as hereinbefore described the member 34 constitutes a separate element which is fixedly mounted on the portion 33 of the shaft 26 it will be appreciated that in alternative embodiments (not shown) of the invention the member 34 may of course be integrally formed with the shaft 26.

What I claim is:

1. A shaft seal of resiliently deformable elastomeric material, the seal comprising:
    a seal body of annular form having a longitudinal axis and comprising an annular front face, an annular rear face, and an annular inner face;
    and a frusto-conical sealing flange extending outwardly and forwardly from the front face of the seal body adjacent the inner face thereof;
    the inner face of the seal body having an annular concavity; and
    the rear face of the seal body having an annular concavity.

2. A shaft seal according to claim 1, wherein in cross-section on a plane containing the longitudinal axis of the seal body the annular concavity in the inner face is of curved form.

3. A shaft seal according to claim 1, wherein the annular concavity in the inner face of the seal body extends to the rear face of the seal body, whereby to present an inwardly directed, annular edge at the junction of said annular concavity in the inner face and said rear face.

4. A shaft seal according to claim 1, wherein the annular concavity in the inner face of the seal body is spaced rearwardly from the front end of the inner face of the seal body.

5. A shaft seal according to claim 1, wherein the cross-section on a plane containing the longitudinal axis of the seal body the annular concavity in the rear face of the seal body is of curved form.

6. A shaft seal according to claim 1, wherein the seal body further comprises an annular outer face, the annular concavity in the rear face of the seal body extending to the outer face of the seal body, whereby to present a rearwardly directed, annular edge at the junction of said annular concavity in the rear face and said outer face.

7. A shaft seal according to claim 1, wherein an annular chamfer interconnects the inner face and the rear face of the seal body.

8. A shaft seal according to claim 7, wherein the annular concavity in the inner face of the seal body extends to the annular chamfer, whereby to present an inwardly directed annular edge at the junction of said annular concavity in the inner face and the annular chamfer.

9. A shaft seal according to claim 1, wherein an annular chamfer interconnects the inner face and the rear face of the seal body, the annular concavity in the inner face of the seal body extending to the annular chamfer, whereby to present an inwardly directed, annular edge at the junction of said annular concavity in the inner face and the annular chamfer, and the annular concavity in the rear face of the seal body extending to the annular chamfer, whereby to present a rearwardly directed, annular edge at the junction of said annular concavity in the rear face and the annular chamfer.

10. In combination, a rotatable shaft presenting a shoulder thereon;
    a fixed wall facing the shoulder and having an opening through which the shaft is disposed;
    and a shaft seal of resiliently deformable elastomeric material, the seal comprising a seal body of annular form having a longitudinal axis and comprising an annular front face, an annular rear face, and an annular inner face, and a frusto-conical sealing flange extending outwardly and forwardly from the front face of the seal body adjacent the inner face thereof, the inner face of the seal body having an annular concavity; and the rear face of the seal body having an annular concavity;
    the diameter of the shaft being greater than the diameter of the inner face of the seal body such that by resiliently deformation of the seal body the seal is mountable on the shaft with the sealing flange in bearing contact with the fixed wall around the opening therein, with portions of the inner face bounding the annular concavity therein in tight contact with the shaft and said annular concavity in the inner face providing a suction cup effect between the seal body and shaft thereby firmly to secure the seal body to the shaft, and with portions of the rear face bounding the annular concavity therein in tight contact with the shoulder and said annular concavity in the rear face providing a suction cup effect between the seal body and shoulder thereby firmly to secure the seal body to the shoulder.

* * * * *